US007815003B2

(12) United States Patent
Ferrer Almazan

(10) Patent No.: US 7,815,003 B2
(45) Date of Patent: Oct. 19, 2010

(54) MOTORIZED SNOW VEHICLE

(76) Inventor: Pablo Ferrer Almazan, Santander, 8-1°C, Zaragoza (ES) E-50010

( * ) Notice: Subject to any disclaimer, the term of this patent is extended or adjusted under 35 U.S.C. 154(b) by 78 days.

(21) Appl. No.: 11/922,588

(22) PCT Filed: Jun. 19, 2006

(86) PCT No.: PCT/ES2006/000358
§ 371 (c)(1),
(2), (4) Date: Dec. 20, 2007

(87) PCT Pub. No.: WO2006/136631
PCT Pub. Date: Dec. 28, 2006

(65) Prior Publication Data
US 2009/0236164 A1    Sep. 24, 2009

(30) Foreign Application Priority Data
Jun. 21, 2005    (ES) ................................. 200501505

(51) Int. Cl.
*B62M 27/02* (2006.01)

(52) U.S. Cl. ..................... 180/190; 180/9.23; 180/180; 180/181; 280/14.21; 280/14.27; 280/16

(58) Field of Classification Search ................ 180/190, 180/9.23, 180, 181; 280/14.21, 14.27, 16
See application file for complete search history.

(56) References Cited

U.S. PATENT DOCUMENTS

| | | | | | |
|---|---|---|---|---|---|
| 3,799,565 | A | * | 3/1974 | Burtis et al. | 280/16 |
| 3,817,544 | A | * | 6/1974 | Labelle | 280/28 |
| 4,307,788 | A | * | 12/1981 | Shelton | 180/181 |
| 4,984,648 | A | | 1/1991 | Strzok | |
| 5,568,840 | A | * | 10/1996 | Nagata et al. | 180/190 |
| 6,302,232 | B1 | | 10/2001 | Forbes | |
| 6,382,338 | B1 | | 5/2002 | Forbes | |
| 6,725,959 | B1 | | 4/2004 | Shea et al. | |

(Continued)

FOREIGN PATENT DOCUMENTS

EP    0 290 185    11/1988

(Continued)

OTHER PUBLICATIONS

International Search Report issued Jan. 17, 2007 in the International (PCT) Application of which the present application is the U.S. National Stage.

*Primary Examiner*—Lesley Morris
*Assistant Examiner*—Marlon A Arce
(74) *Attorney, Agent, or Firm*—Wenderoth, Lind & Ponack, LLP.

(57) ABSTRACT

A motorized vehicle is of a type which is used to travel on snow and which is equipped with at least one ski and one caterpillar track. The motorized vehicle comprises: handlebars (2) which are solidly connected to a chassis (3) of the vehicle (1); a pair of skis (4) which are solidly connected to the chassis (3) and which are not symmetrical in relation to the longitudinal and transverse axes thereof, the width of each ski decreasing from front to rear and the outer side (5) being curvilinear; and a platform (6) for a standing user, the width of the platform being greater than the maximum distance separating the two skis (4).

5 Claims, 5 Drawing Sheets

U.S. PATENT DOCUMENTS

| | | | |
|---|---|---|---|
| 7,475,751 B2 * | 1/2009 | Pard et al. | 180/190 |
| 2002/0089133 A1 * | 7/2002 | Dempster | 280/16 |
| 2004/0238251 A1 * | 12/2004 | Oron et al. | 180/180 |
| 2006/0197294 A1 * | 9/2006 | Yau | 280/16 |
| 2006/0232028 A1 * | 10/2006 | Pard et al. | 280/22.1 |

FOREIGN PATENT DOCUMENTS

| | | |
|---|---|---|
| JP | 4-331659 | 11/1992 |
| WO | 87/01085 | 2/1987 |
| WO | 96/36045 | 11/1996 |
| WO | 99/43450 | 9/1999 |
| WO | 01/81160 | 11/2001 |

* cited by examiner

MOTORIZED SNOW VEHICLE

BACKGROUND OF THE INVENTION

The present invention relates to a motorized snow vehicle, being of the type which is used to travel on snow and which is equipped with at least one ski and a caterpillar track for movement, in such a way that the vehicle that is presented has a platform for the user to stand on, a fixed handlebar and a pair of skis with their outer side curvilinear according to a curvo-concavity with the aim of permitting tight bends to be taken with just the lateral inclination of the vehicle along with the user.

Moreover, the motorized vehicle has low weight since, due to lacking a steering shaft, it does not require the fitting of all the elements comprising it, which facilitates its driving and likewise, given that, as is logical, its size is also reduced and it has a foldable handlebar, it can be transported in the boot (trunk) of an automobile for private use (utilitarian).

The present specification describes a motorized snow vehicle, which is of special application in ski resorts, both for employees of the resort and for users of the facilities.

So, the motorized snow vehicle can be used as a working vehicle and as a pleasure vehicle, due to the fact that its agreeable driving is done by the lateral inclination of the vehicle along with the user, and by means of which a very diverse range of maneuvers are permitted to be performed.

As is known, winter sports are becoming ever more popular, such that ski resorts are acquiring larger dimensions for being able to meet the ever greater demand from users, at the same time as the range of sports and/or products is widening and become more popular.

So, not only is there an increase in skiers within the various categories of skiing, but there are other modalities such as snowboarding which has an ever growing number of adepts.

Likewise, the increase in winter sports enthusiasts and the consequent growth in ski resorts has led to the popularization of snowmobiles, both for working use by the actual employees for moving around the facilities of the ski resorts, and for pleasure use.

In this way, and focusing on snowmobiles as being the vehicles that are "closest" to the motorized vehicle that is the object of the invention, we can point out that the basic concept of the two differ from each other in their entirety since, in snowmobiles the user sits and they have a steering shaft associated with the ski of the vehicle, with the vehicle being turned by means of turning the steering shaft and, consequently, the ski associated with it, So, in turning, the longitudinal axis of the snowmobile is different from the longitudinal axis of the ski.

Moreover, the ski in a snowmobile has straight sides and, with the aim of performing the turn, its inner face has some longitudinal straight blades of the guide type running along the ski which stick into the snow since without these blades the response to turns would be excessively slow and inefficient.

In addition, if the skis of snowmobiles do not include these blades they skid and would not have any effective turn, rather like the inefficiency in steering a car driving on ice.

We can equally point out that snowmobiles have a considerable weight (around 180 to 320 kg, and with the added regular problem of becoming stuck in the snow due to their excessive weight) which makes it difficult to transport them, since it is not feasible to carry them in the boot (trunk) of an automobile for private use (utilitarian), which means that their use as a pleasure or recreational item becomes very restricted, aided by the fact that when driving them it is not possible to introduce "variants" leading to a driving with pleasure "effects".

This is so due, among other things, to the actual weight of the snowmobiles and because the user is always in the seating position, without any possibility of inclining the snowmobile in order to achieve turns.

We can thus summarize matters by pointing out that snowmobiles have been known for many years and there are numerous patents that have been filed in relation to them.

So, among other documents we can cite the following documents: WO 87/01085-A; WO 99/43450-A; U.S. Pat. No. 6,302,232 B1; U.S. Pat. No. 6,382,338 B1; U.S. Pat. No. 4,984,648 and U.S. Pat. No. 6,725,959 B1.

Finally, we can cite WO 96/36045 from the same holder as the present patent application, describing a "sliding board with motor and swivelling caterpillar tread or crawler track for use on snowy terrain or similar", in which the board presents a longitudinal open and centered space for the location of a swivelling structure with rollers which support and guide the track or tread. The motor and variator unit transmit the movement to a tractor roller which causes the track to turn.

SUMMARY OF THE INVENTION

The present specification describes a motorized snow vehicle, being of the type is used to travel on snow and which is equipped with at least one ski and a caterpillar track; wherein the vehicle comprises:

a handlebar which is solidly connected to the chassis of the vehicle so that steering of the handlebar is not possible;

a pair of skis which are solidly connected to the chassis so that their steering is not possible; the skis being not symmetrical in relation to the longitudinal and transverse axes thereof, the width of each ski decreasing from front to rear and the outer side being curvilinear; and a platform for a standing user, the width of said platform being greater than the maximum distance separating the two skis.

So, an essential characteristic of the vehicle that is presented is that the handlebar for grasping is integral with the chassis of the vehicle so that the vehicle lacks a steering shaft.

Moreover, the handlebar that is integral with the chassis of the vehicle presents a width greater than the maximum width of the pair of skis.

In this way, with the inclination of the vehicle in accordance with the user weight shifting to one side or the other, a change in direction of the vehicle takes place, but in a way such that the pair of skis and the handlebar remain aligned with the longitudinal axis of the actual vehicle. This inclination maneuver is facilitated by the fact that the platform where the user stands and the handlebar have a width greater than the maximum separation width of the pair of skis, providing a leverage effect in order to incline the vehicle to one side.

Furthermore, the handlebar that is integral with the chassis of the vehicle, with a static position in the use thereof, can be folded with the aim of taking up less space during transport, in such a way that given the dimensions and weight of the vehicle, it can be carried in the boot (trunk) of an automobile for private use.

In addition, the pair of skis can be extended via their rear ends as far as the zone of location of the caterpillar tread, given that, being integral with chassis of the vehicle and not presenting any turn at all, they do not represent any drawback whatsoever in driving the vehicle.

Indeed, by means of the vehicle that is presented, even without the possibility of turning the handlebar, in other words, lacking any kind of steering shaft, some very tight turns are able to be made just with the inclination of the vehicle along with the user, this being as a consequence of the curvilinear curvo-concave outline of the outer side of the pair of skis.

In order to complement the description that is going to be made forthwith, and with the aim of facilitating a better understanding of the characteristics of this invention, this specification is accompanied by a set of drawing figures in which, on an illustrative rather than limiting basis, the most characteristic details of the invention have been represented.

BRIEF DESCRIPTION OF THE DRAWINGS

FIG. 4 shows a lateral elevation view of the vehicle of FIG. 2, with a user close by.

DETAILED DESCRIPTION OF A PREFERRED EMBODIMENT

Figure 1:
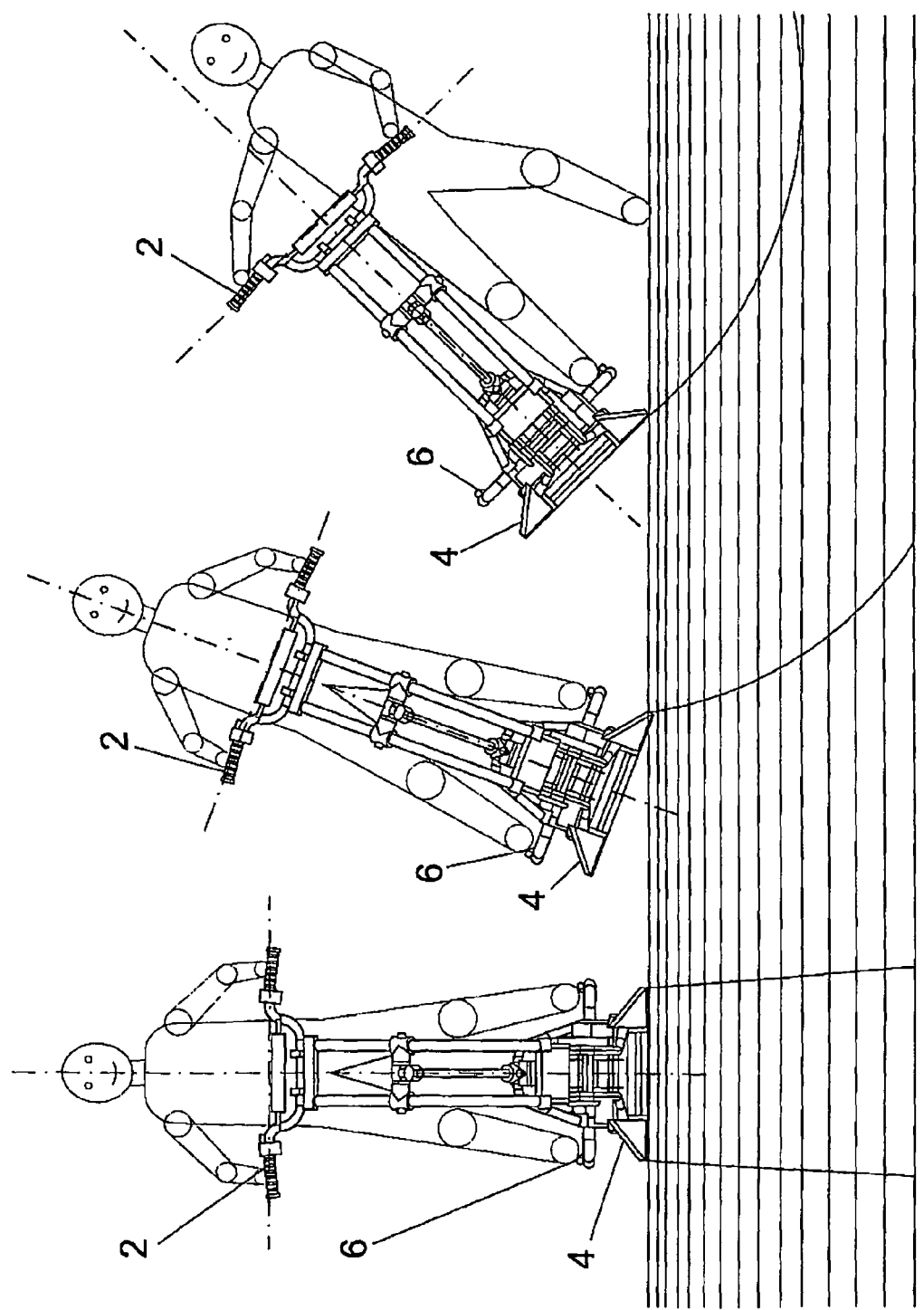
FIG. 1 shows a front view of a driving sequence of a vehicle, where it can be seen how a handlebar for grasping remains fixed causing the vehicle to turn when it is inclined to one side along with the user, as a consequence of a curvo-concave curvilinear outline of the outer side of a pair of skis, with the path that the vehicle will follow also being able to be seen.
Figure 2:
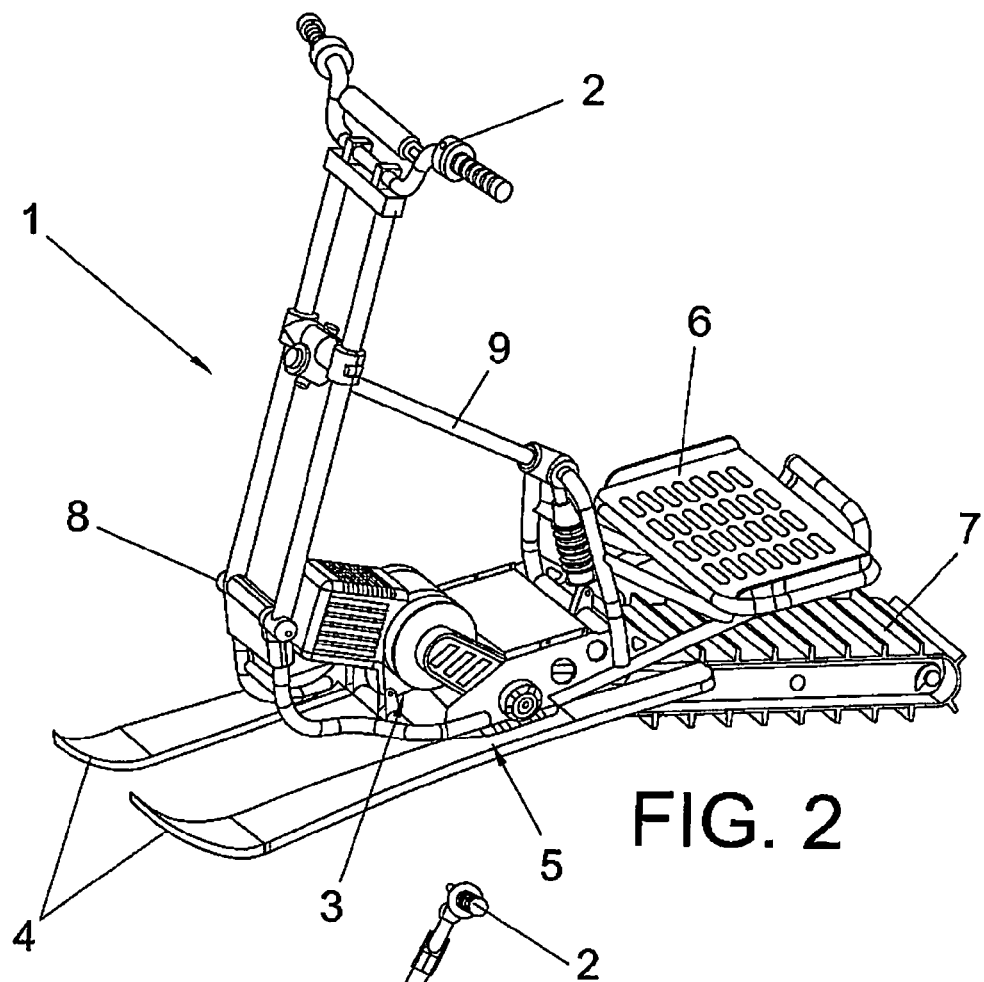
FIG. 2 shows a perspective view of a motorized snow vehicle, in which a platform for the user to stand on and the fixed handlebar for grasping can be seen.
Figure 3:
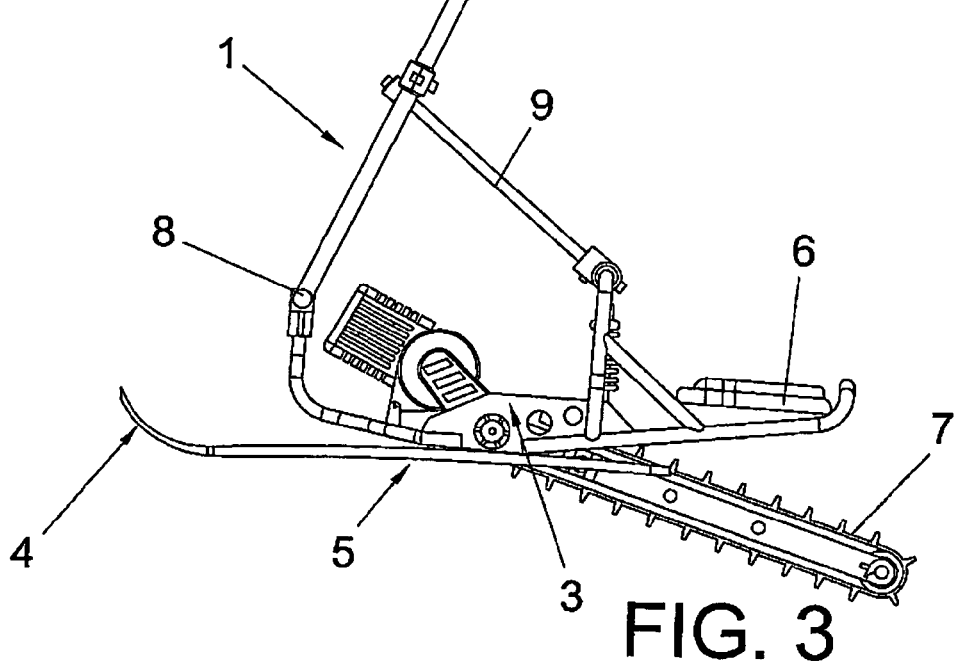
FIG. 3 shows a lateral elevation view of the vehicle of the previous figure, showing how the skis and a caterpillar track are not located in the same plane due to being suspended from the vehicle, when there is no one standing on it.
Figure 4:
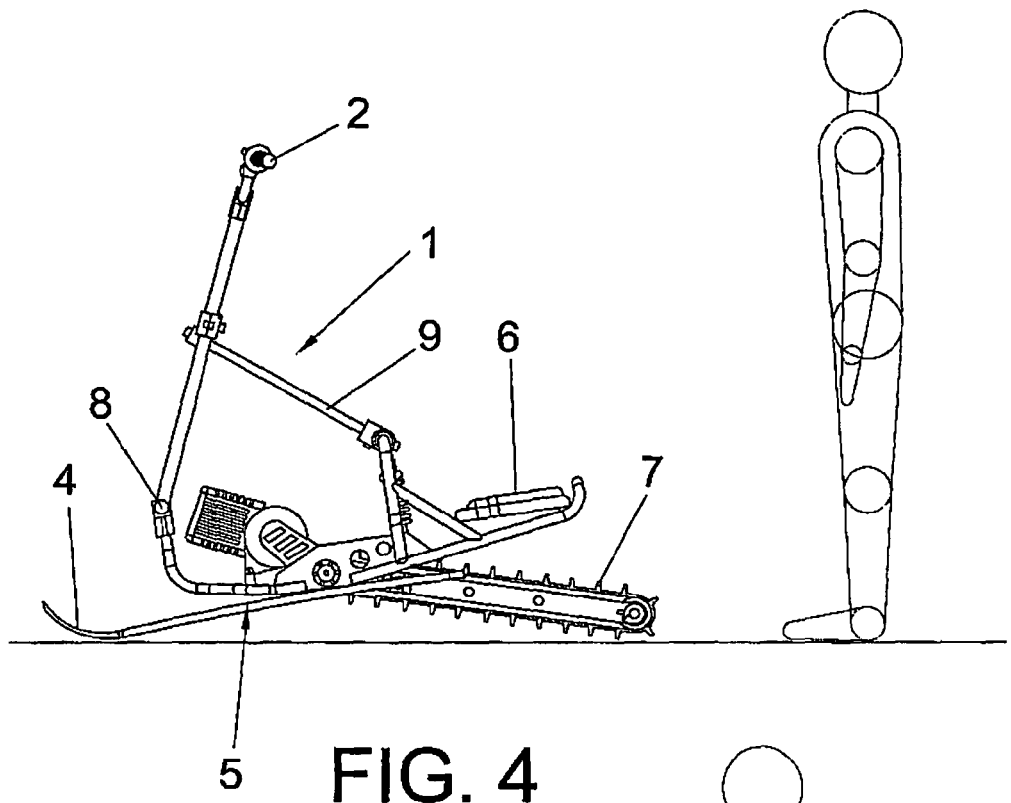
Figure 5:
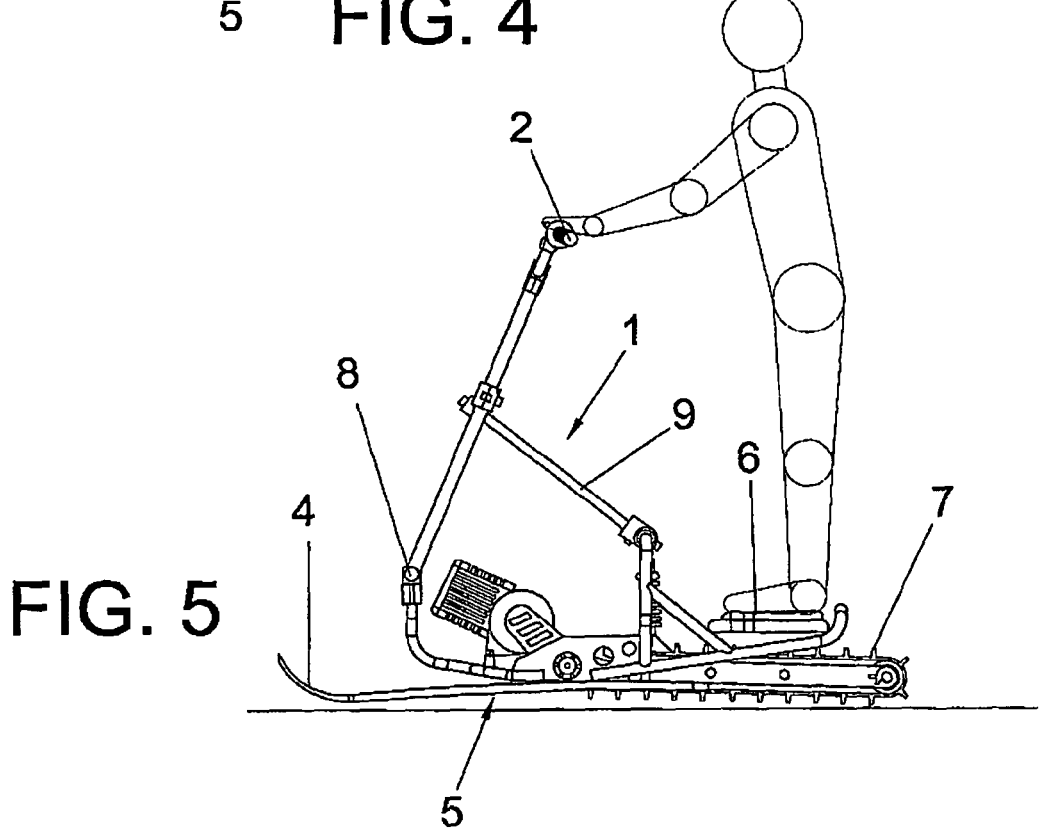
FIG. 5 shows a lateral elevation view of the vehicle of the previous figure with a user climbed on, in which it can be seen how the weight of the user causes the suspension to give way.

With the drawing figures in view and in accordance with the numbering adopted, we can see how the motorized snow vehicle 1 presents a handlebar 2 for grasping mounted, when the vehicle 1 is in use, in a position that is static relative to a chassis 3 thereof. In other words, the handlebar 2 is not associated with any steering shaft, and is of utility solely for being grasped by the user.

Likewise, the motorized snow vehicle 1 has a pair of skis 4 integral with the chassis 3, the skis 4 being asymmetric in relation to their longitudinal axis, with a width that decreases from their front end to their rear end and their outer side 5 presenting a curvilinear form, according to a curvo-concavity.

Equally, the motorized snow vehicle 1 presents a platform 6 for the user to stand on, of width greater than the maximum separation width of the pair of skis 4.

In the same way, the handlebar 2 of the motorized snow vehicle 1 also presents a width greater than the maximum separation width of the pair of skis 4.

With this structure in which the motorized vehicle 1 lacks a steering shaft, and, logically, all the components thereof, the size and weight of the vehicle is reduced, displaying a center of gravity that is very low, granting it great stability, in such a way that when being used, the user stands on a platform 6 and, grasping the handlebar 2, he drives the motorized vehicle 1 in such a manner that for a straight route it will suffice for him to remain in the vertical position, while at the moment of making turns it will suffice for the user to incline himself in order for the vehicle 1 to turn.

In FIG. 1, it can be seen how, in driving the motorized vehicle, when the user inclines the vehicle changes direction, being able to take very tight bends, and granting the vehicle 1 great versatility, being of utility as a working vehicle, primarily for employees to move around the ski resort, and also as a pleasure vehicle so that the user can have a very agreeable ride, these types of maneuvers being permissible due to the specific geometry and arrangement of the entire set of elements making up the vehicle.

As can be seen in FIG. 1, when driving the motorized vehicle 1, the user can even rest one foot on the snow in order to permit turns to be made with a very tight radius of as little as 0.5 m, and have a pleasurable ride.

So, as the platform 6 and the handlebar 2 have a width greater than the maximum width of the pair of skis 4. when it comes to making the turns, with the simple displacement on the platform 6 and inclination of the user, a "leverage" effect is transmitted which permits very tight turns to be obtained, this being in part a consequence of the curvo-concave curvilinear outline of the outer side 5 of the skis.

Figure 6:
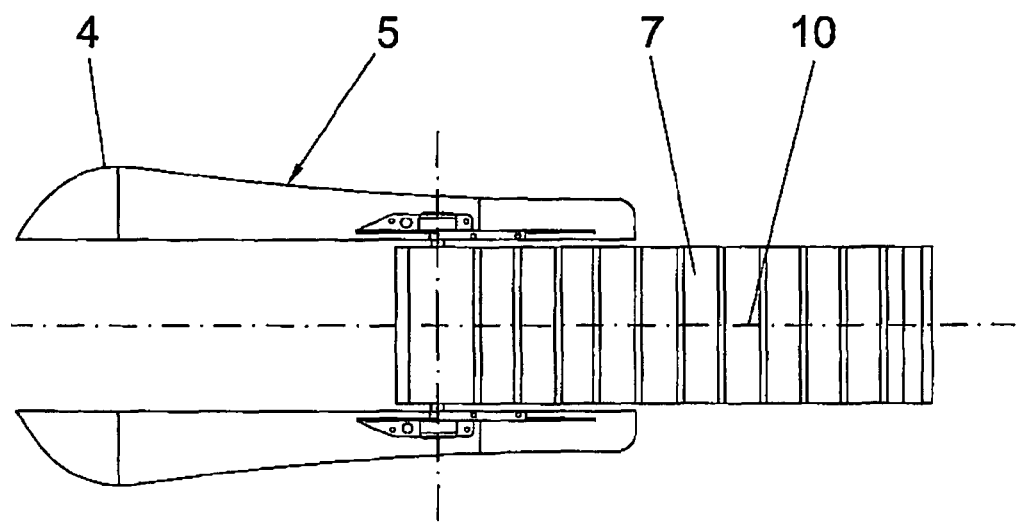
FIG. 6 shows a schematic plan view of the caterpillar and the pair of skis, according to a practical embodiment in which the pair of skis present their inner face completely straight.
Figure 7:
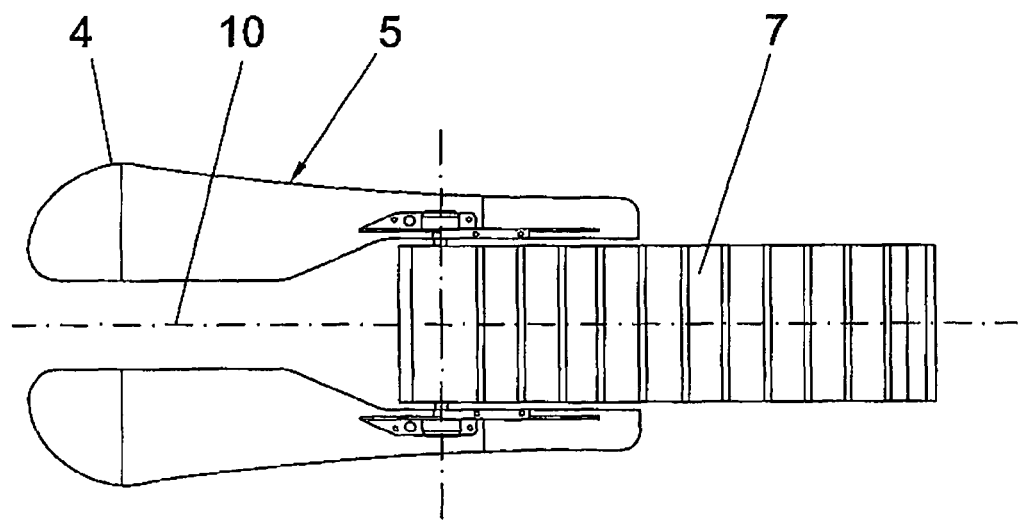
FIG. 7 shows a schematic plan view of the caterpillar and the pair of skis, according to a practical embodiment in which the pair of skis present their front part considerably wider than the rear part.
Figure 8:
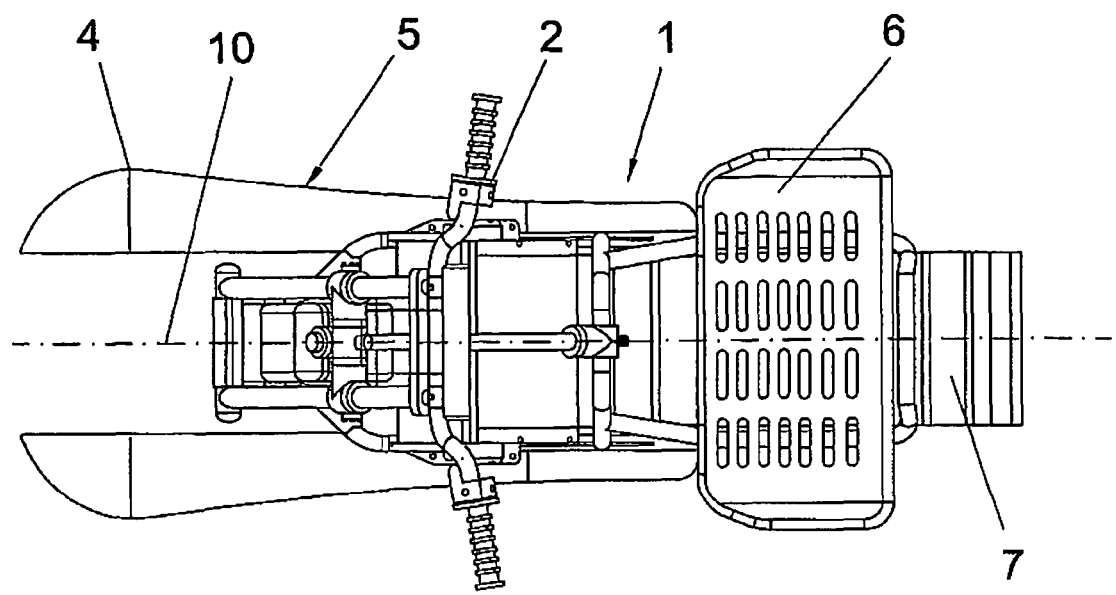
FIG. 8 shows a plan view of the vehicle forming the object of the invention, in which it can be seen how the platform for holding the user and the handlebar present a greater width than the maximum width of the pair of skis.
Figure 9:
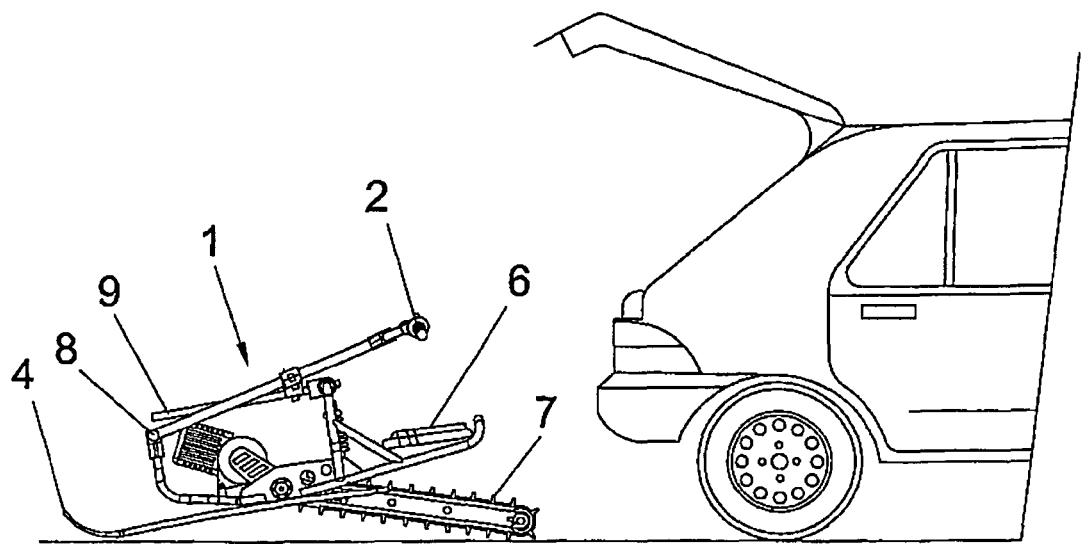
FIG. 9 shows a lateral elevation view of a motorized snow vehicle in the "folded" position for being carried in the boot (trunk) of an automobile.

FIGS. 6 and 7 show how the pair of skis 4 present the outer side 5 with a curvo-concave curvilinear form with a width that decreases from the front to the rear and how the width can vary depending on, for example, the type of snow on which the vehicle is going to be driven.

We can likewise see how the pair of skis 4 can be extended via their rear part on both sides of a caterpillar track 7 for transmission of the movement, this being possible due to the fact that the pair of skis are integrally joined to the chassis of the vehicle. This execution is not possible in other kinds of snow vehicle fitted with a steering shaft associated with the ski/skis, in which the ski/skis have to remain forward of the caterpillar since it or they would otherwise collide with the caterpillar when being turned.

Moreover, and in accordance with what has already been stated, given the dimensions and the weight (approximately 50 kg) of the motorized vehicle 1, it can be transported in the boot (trunk) of an automobile for private use, for which the handlebar 2 can be folded due to being attached to the chassis 3 of the vehicle 1 by a turning shaft 8 and secured by a bar 9.

In this way, at the moment of using the vehicle 1, the handlebar 2 will remain in a completely static position by means of the bar 9 and when being transported it will be able to be folded with the aim of taking up less space.

Moreover, as well as all the advantages referred to, it is also important to add the fact that, due to being a light vehicle, there is a considerable saving in fuel and less pollution as a result. In other words, it contributes a major environmental advantage.

The invention claimed is:

1. A motorized snow vehicle, being of a type which is used to travel on snow and which is equipped with at least one ski and a caterpillar track, the vehicle comprising:

a handlebar (2) which is solidly connected to the chassis (3) of the vehicle (1) so that steering of the handlebar is not possible;

a pair of skis (4) which are solidly connected to the chassis (3) so that their steering is not possible; the skis (4) not being symmetrical in relation to the longitudinal and transverse axes thereof, the width of each ski decreasing from front to rear and the outer side (5) being curvilinear and the two skis (4) can be extended longitudinally backward from their rear part along both sides of the caterpillar track as far as the caterpillar track position (7); and a platform (6) for a standing user, the width of said platform being greater than the maximum distance separating the two skis (4).

2. A motorized snow vehicle, according to claim 1, wherein the handlebar (2) is wider than the maximum distance separating the two skis (4).

3. A motorized snow vehicle, according to claim 1, wherein the two skis (4) and the handlebar (2) remain at the same relative position as aligned with the longitudinal axis (10) of the vehicle (1) while turning left or right in its movement as the user shifts his weight to the left or right side, respectively.

4. A motorized snow vehicle, according to claim 2, wherein the two skis (4) and the handlebar (2) remain at the same relative position as aligned with the longitudinal axis (10) of the vehicle (1) while turning left or right in its movement as the user shifts his weight to the left or right side, respectively.

5. A motorized snow vehicle, according to claim 1, wherein in the vehicle static position the handlebar (2) is attached to the chassis (3) of the vehicle (1) in a folding manner by a joint (8) permitting its folding for transportation.

* * * * *